(12) United States Patent
Anderson et al.

(10) Patent No.: US 7,664,090 B2
(45) Date of Patent: Feb. 16, 2010

(54) INTRA-FRAME CODE DIVERSITY

(75) Inventors: Nicholas William Anderson, Bristol (GB); Vishakan Ponnampalam, Chesterfield (GB)

(73) Assignee: IPWireless, Inc., San Francisco, CA (US)

( * ) Notice: Subject to any disclaimer, the term of this patent is extended or adjusted under 35 U.S.C. 154(b) by 219 days.

(21) Appl. No.: 11/202,535

(22) Filed: Aug. 11, 2005

(65) Prior Publication Data

US 2006/0039343 A1 Feb. 23, 2006

Related U.S. Application Data

(60) Provisional application No. 60/601,287, filed on Aug. 12, 2004.

(51) Int. Cl.
*H04B 7/216* (2006.01)
(52) U.S. Cl. .............. 370/342; 370/335; 370/320; 370/326; 370/347; 370/337
(58) Field of Classification Search ............... 370/342, 370/336, 335, 320, 208, 321, 337, 347
See application file for complete search history.

(56) References Cited

U.S. PATENT DOCUMENTS 5,894,473 A * 4/1999 Dent ...................... 370/342
5,896,368 A * 4/1999 Dahlman et al. ........... 370/335

FOREIGN PATENT DOCUMENTS

EP 1063780 A2 * 12/2000
WO WO-0074255 A1 12/2000

OTHER PUBLICATIONS

Unal, B. et al. (1996). "Code-Hopping as a New Strategy to Improve Performance of S-CDMA Cellular Systems," *Global Telecommunications Conference, 2006. Globecom '06. IEEE* 2:1316-1319.
"Simulation Results for TDD Cell Parameter Cycling," Jan. 18-21, 2000, 3GPP TSG RAN WG1#10, 7 pages.
International Search Report and Written Opinion mailed Nov. 7, 2005, for PCT Application No. PCT/EP2005/053966 filed Aug. 11, 2005, 12 pages.

* cited by examiner

*Primary Examiner*—Vincent P Harper
*Assistant Examiner*—Dung Lam
(74) *Attorney, Agent, or Firm*—Fitch Even Tabin & Flannery

(57) ABSTRACT

Provided are methods and apparatuses to encode portions of user data with corresponding spreading sequences within a frame wherein the user data is associated with a single user.

22 Claims, 2 Drawing Sheets

INTRA-FRAME CODE DIVERSITY

CROSS-REFERENCE TO RELATED APPLICATIONS

This application claims the benefit of priority to U.S. provisional application Ser. No. 60/601,287, filed Aug. 12, 2004, the disclosure of which is incorporated herein by reference in its entirety.

BACKGROUND OF THE INVENTION

1. Field of the Invention

This invention relates to mobile radio signal diversity, and more particularly, to encoding downlink and uplink mobile radio data transmitted in multiple timeslots within a frame from a single source, wherein portions of the data are encoded with different spreading sequences.

2. Description of the Prior Art

Data is transmitted in CDMA radio systems by means of sending a code sequence for each bit or data symbol. Each user is assigned a different code. If a user transmits data on multiple channels, each user channel is assigned a different code. By using different codes, multiple users may transmit signals within the same frequency band within the same timeslot. The codes are generally designed such that they have good cross-correlation properties. Good cross-correlation properties allow a receiver to correlate a received composite signal containing a number of codes in order to separate out one or more individually coded signals from the composite signal.

Good cross-correlation properties cannot always be obtained among a group of selected codes. Furthermore, multipath in a radio channel can change the cross-correlation properties of a signal before a signal arrives at a receiver. Therefore, there are some instances where the cross-correlation among signals is good, and other instances when the cross correlation deteriorates. Poor cross correlation may lead to inadequate radio link performance, an increase in bursts of data errors, and loss of the spectral efficiency of the system.

BRIEF SUMMARY OF THE INVENTION

Some embodiments of the present invention provide a method of transmitting data on a link from a first radio to a second radio across a plurality of timeslots in a frame, the method comprising: associating a first portion of user data with a first portion of the frame; associating a second portion of user data with a second portion of the frame; encoding the first portion of user data with a first spreading sequence; encoding the second portion of user data with a second spreading sequence, wherein the first spreading sequence differs from the second spreading sequence; transmitting, from the first radio to the second radio, the encoded first portion of user data in the first portion of the frame; and transmitting, from the first radio to the second radio, the encoded second portion of user data in the second portion of the frame.

Some embodiments of the present invention provide a method wherein a timeslot includes the first portion of the frame and the second portion of the frame. Some embodiments of the present invention provide a method wherein the first portion of the frame includes a first timeslot of the frame and the second portion of the frame includes a second timeslot of the frame, wherein the second timeslot is different than the first timeslot. Some embodiments of the present invention provide a method wherein the first timeslot and the second timeslot are adjacent timeslots. Some embodiments of the present invention provide a method wherein the first timeslot and the second timeslot are timeslots separated by at least one timeslot period.

Some embodiments of the present invention provide a method further comprising: encoding a third portion of user data with a third spreading sequence; encoding a fourth portion of user data with the fourth spreading sequence, wherein the fourth spreading sequence is different from the third spreading sequence; transmitting, from the first radio to the second radio, the encoded third portion of user data in a first portion of a second frame, wherein the first portion of the second frame corresponds to the first portion of the first frame; and transmitting, from the first radio to the second radio, the encoded fourth portion of user data in a second portion of the second frame, wherein the second portion of the second frame corresponds to the second portion of the first frame. Some embodiments of the present invention provide a method further comprising applying forward error correction over multiple timeslots in a frame.

Some embodiments of the present invention provide a method further comprising applying interleaving over multiple timeslots. Some embodiments of the present invention provide a method wherein the first spreading sequence includes a first scrambling code and wherein the second spreading sequence includes a second scrambling code different from the first scrambling code. Some embodiments of the present invention provide a method wherein: transmitting, from the first radio to the second radio, the encoded first portion of user data in the first portion of the frame includes transmitting a first midamble sequence; and transmitting, from the first radio to the second radio, the encoded second portion of user data in the second portion of the frame includes transmitting a second midamble sequence different from the first midamble sequence.

Some embodiments of the present invention provide a method further comprising: determining the first spreading sequence for the first portion of user data; and determining the second spreading sequence for the second portion of user data. Some embodiments of the present invention provide a method wherein the link includes an uplink, wherein the first radio includes a mobile radio, and wherein the second radio includes a base station. Some embodiments of the present invention provide a method wherein the link includes a downlink, wherein the first radio includes a base station, and wherein the second radio includes a mobile radio.

Some embodiments of the present invention provide a code diversity transmitter comprising: logic to accept user data; code mapping and distribution logic, wherein the code mapping and distribution logic is operable to parse user data into a first portion of user data and a second portion of user data; encoding logic operable to encode the first portion of user data with a first spreading sequence and operable to encode the second portion of user data with a second spreading sequence different from the first spreading sequence; and a transmitter coupled to the encoding logic and operable to transmit encoded user data.

Some embodiments of the present invention provide a code diversity transmitter further comprising forward error correction (FEC) logic operable to apply forward error correction to user data, the FEC logic coupled between the logic to accept user data and the code mapping and distribution logic. Some embodiments of the present invention provide a code diversity transmitter further comprising logic to apply interleaving, the interleaving logic coupled between the logic to accept user data and the code mapping and distribution logic. Some embodiments of the present invention provide a code diversity transmitter wherein the first portion of user data includes a timeslot block of data. Some embodiments of the present invention provide a code diversity transmitter wherein the first spreading sequence includes a first scrambling code and the second spreading sequence includes a second scrambling code different from the first scrambling code.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION OF THE INVENTION

In the following description, reference is made to the accompanying drawings which illustrate several embodiments of the present invention. It is understood that other embodiments may be utilized and mechanical, compositional, structural, electrical and operational changes may be made without departing from the spirit and scope of the present disclosure. The following detailed description is not to be taken in a limiting sense, and the scope of the embodiments of the present invention is defined by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process etc. are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Some CDMA systems select a spreading code from a defined a set of values. In some CDMA systems, such as 3GPP UTRA TDD/FDD systems, spreading codes may be constructed from two components: a channelization code component and a scrambling code component. For example, in a 3GPP UTRA TDD CDMA system, a spreading code consists of a scrambling code and a channelization code. Generally, a system may use the channelization code component for separating multiple users within a timeslot of a cell and the scrambling code component for distinguishing between signals originating from within a cell from signals arriving from other cells.

Figure 1:
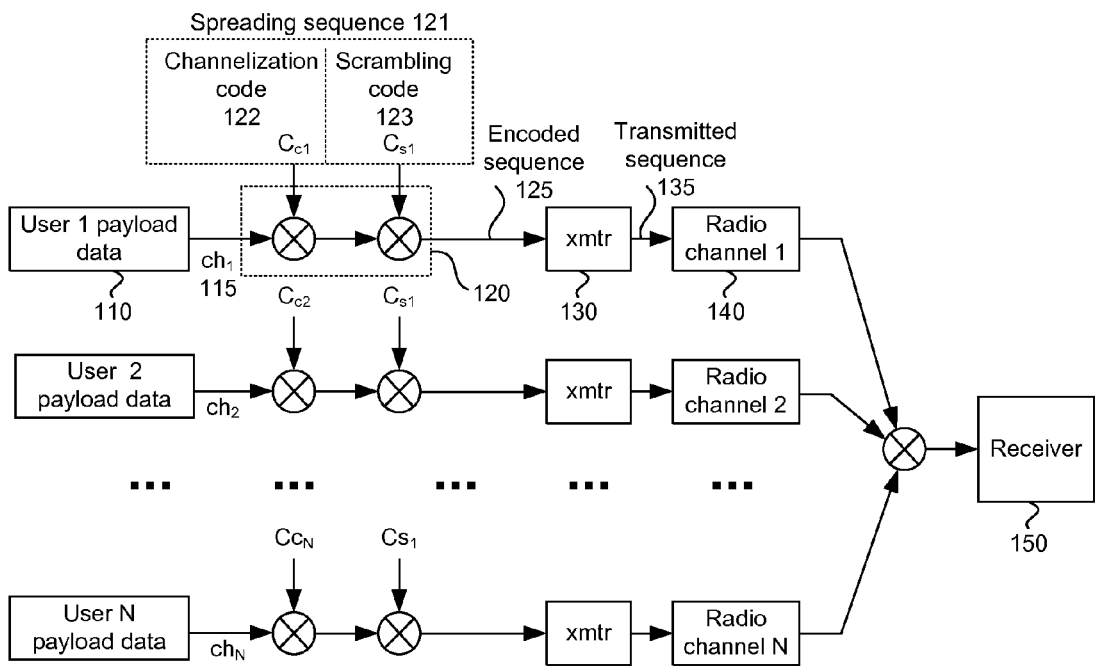
FIG. 1 shows a model of an uplink TDD CDMA encoding, transmission and reception system in accordance with the present invention.

FIG. 1 shows a model of an uplink TDD CDMA encoding, transmission and reception system. User payload data 110 is provided to a spreader 120 as channel data ($ch_1$) 115. The spreader 120 also accepts a spreading sequence 121 (channelization code $C_{c1}$ 122 and scrambling code $C_{s1}$ 123). The spreader 120 encodes the user payload data 110 with a spreading sequence 121 by encoding it with a channelization code ($C_{c1}$) 122 and with a cell-specific scrambling code ($C_{s1}$) 123.

Users belonging to a common cell may share the same cell-specific scrambling code ($C_{s1}$) 123. Users belonging to a different cell will have a different cell-specific scrambling code (e.g., $C_{s2}$). The encoded payload data forms an encoded sequence 125 that is provided to a transmitter (xmtr) 130 and is transmitted as a sequence 135 through a radio channel 140. The radio channel 140 is formed between a user equipment transmitter 130 and a base station receiver 150. The received signal is then processed by the base station to separate each user's payload data.

Figure 2:
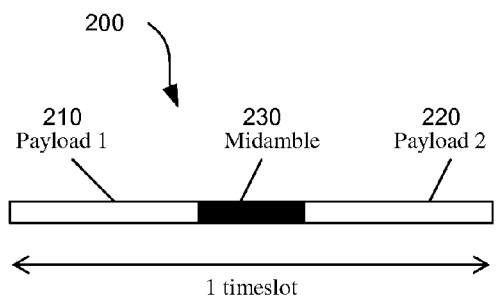
FIG. 2 shows a TDD CDMA timeslot burst in accordance with the present invention.

FIG. 2 shows a timeslot burst signal 200, for example, a timeslot burst signal from a TDD CDMA user. The encoded sequence 125 (FIG. 1) is divided into a first payload section 210 and a second payload section 220. A timeslot burst signal 200 consists of the first payload section 210 preceding a midamble sequence 230, which is followed by the second payload section 220. A receiver uses the known midamble sequence 230 to determine an impulse response of the radio channel 140 (FIG. 1). The impulse response assists the receiver 150 in the detection and demodulation process.

The properties of the spreading sequence 121, which consists of the channelization codes 122 and scrambling code 123, play an important part in determining the radio link performance. To better understand this performance, consider two interference scenarios: inter-cell interference and intra-cell interference.

Inter-cell interference is interference that originates from one or more neighboring cells. When substantial energy from other cells is present at the receiver in addition to the energy from the home cell, the cross-correlation properties of the received waveforms heavily influence the link performance. Overlapping sets of channelization codes 122 may be used within two neighboring cells, a home cell and its neighboring cell. When overlapping channelization codes 122 are used in a neighboring cell, the correlation properties of a received waveform are primarily influenced by: (1) the scrambling sequences applied within the home cell; (2) the scrambling sequences 121 applied in the neighboring interfering cell; and (3) the radio propagation channels through which each signal has passed.

If the cross-correlation properties are poor between two or more signal sequences arriving at a receiver during the same timeslot, link performance will suffer. Due to the fact that the scrambling component of the overall spreading sequence 121 is cell specific and the fact that the set of available channelization codes 122 is limited to a relatively small set of values, there is a potential for spreading sequences 121 with poor cross-correlation properties to persistently oppose each other and to thus persistently degrade system performance.

Unlike inter-cell interference, intra-cell interference is interference that originates from within a cell. The channelization codes may be designed to be orthogonal such that the selected codes have ideal cross-correlation properties. Orthogonality is often destroyed before signals reach a receiver. Orthogonality may be destroyed by the time-dispersive nature of a radio channel. Orthogonality between two or more uplink signals may also be destroyed if the uplink bursts transmitted in the same timeslot arrive at a base station at different times.

Forward error correction (FEC) combined with interleaving of radio transmissions help to overcome short-term signal power fluctuations (fading) in a radio channel. In these schemes, the data is encoded over a time period that spans multiple fading events and an interleaver is used to distribute the effects of resulting bit errors evenly throughout the received signal. The power of the forward error correcting code is then able to recover these small gaps or errors in the received data. If a signal is not substantially degraded and if forward error correction and interleaving work properly, the underlying information content may be delivered error free.

Forward error correction and interleaving may also help to alleviate error bursts caused by two signal sequences having instantaneously-poor cross-correlation properties. Forward error correction also provides the benefit of reducing the overall variability observed in link performance across users and the benefit of reducing the same variability in the time domain. Forward error correction may also improve stability of processes that control the quality of signals passing over the radio link.

A form of time diversity on a frame-by-frame basis may be used to alleviate some of the effects of inter-cell interference on cross-correlation properties. For example, 3GPP systems implement cell parameter ID cycling. In such systems, each cell is assigned two scrambling codes. Odd numbered frames are encoded with a first scrambling code and even frames are encoded with a second scrambling code.

If a system uses a single scrambling code and is operating in an environment where the one selected scrambling code results in consistently poor cross-correlation properties, the cross-correlation properties are always poor. If a system uses two scrambling codes in the same environment, the cross-correlation properties may be poor only half of the time. If a sequence has poor cross-correlation properties with other signals in one frame, the next sequence may have better cross-correlation properties in the next frame.

Figure 3:
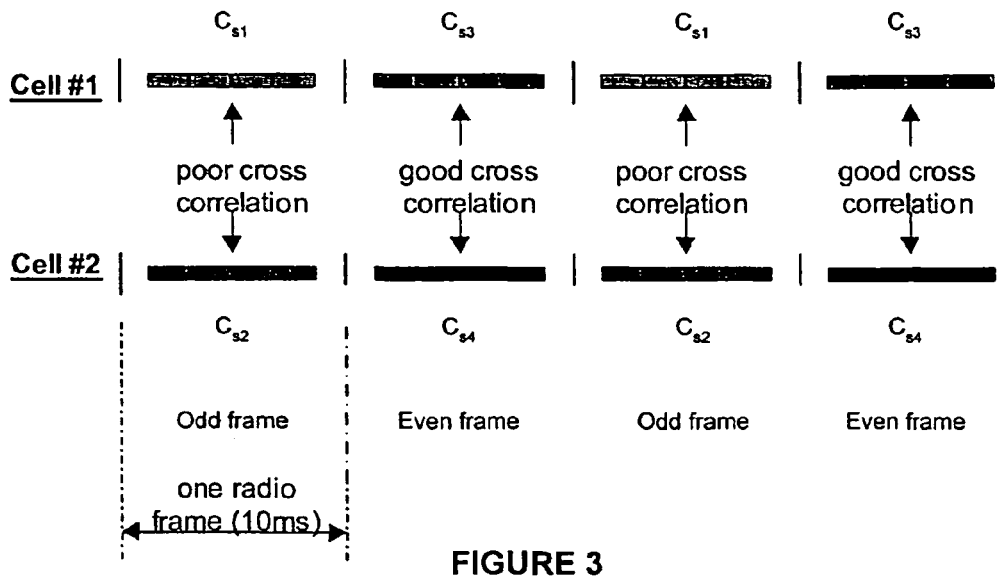
FIG. 3 shows a form of code diversity using frame-based cell ID cycling in accordance with the present invention.

FIG. 3 shows a form of code diversity using frame-based cell ID cycling. In this example, sequences in odd frames in a first cell (Cell #1) use a first spreading sequence having unique scrambling code ($C_{s1}$). Sequences in odd frames in a second cell (Cell #2) use a second spreading sequence having unique scrambling code ($C_{s2}$). Similarly, sequences in even frames in the first cell use a third scrambling code ($C_{s3}$). Sequences in even frames in the second cell use a fourth scrambling code ($C_{s4}$). In this example, the codes used in odd frames have poor cross-correlation properties between the first and second cells. Fortunately, the codes used in even frames have good cross-correlation properties. The change in correlation properties is due to a change in cell-specific scrambling codes ($C_{si}$).

In this example, additional link performance may be realized if forward error correction is applied over a transmission time interval (TTI) equal to or greater than two radio frames (20 ms). The FEC may be applied to pairs of frames in a cell. The use of interleaving may further improve the link performance.

In addition to the scrambling code changing with the cell parameter ID, the midamble sequence may also be changed. This can bring about similar randomization of the cross correlation between arriving midamble waveforms, which may be exploited to compute better channel estimates in the receiver.

By moving more error correction and retransmission control functionality down from a base station controller, such as an RNC, to a base station, such as a Node-B, a wireless communication system can reduce control, transmission and retransmission latencies. For packet data, minimizing latency of transmissions is a goal in providing a high perceived throughput to the end user. High latency appears simply as a slow data link to the user, whereas low latency creates a perception in the user of being connected via a high-throughput data link.

With the current 3GPP system of frame-based cell ID cycling, the data must be transmitted over a 20 ms TTI or greater in order to realize the benefits of code diversity. This immediately introduces latency onto the radio link and means that transmissions using TTI's less than 20 ms cannot benefit from frame-based code diversity. Frame-based code diversity is inadequate for low latency (<20 ms) transmissions with the current 3GPP scheme.

Additionally, the current 3GPP cell parameter ID cyclic is targeted at improving the situation for the inter-cell interference case. Attention to the intra-cell interference case is lacking.

In some embodiments of the present invention, the TTI is assumed to be no more than 1 radio frame. Each transmission within the TTI is composed of one or more timeslots. In 3.84 Megachips per second (Mcps) 3GPP UTRA TDD, 1 radio frame is 10 ms long and includes 15 timeslots of which up to 14 may be assigned to uplink traffic. Within the system, timeslot and channelization code resources are likely to be allocated on a relatively fast basis (e.g., on a frame-by-frame basis) by a network entity, such as the base station or a base station controller.

The number of timeslots allocated to a user and the assigned channelization codes is likely to vary according to the data traffic needs of that user. In general, it will be common for a user to be allocated more than one timeslot per radio frame for a user demanding high throughput. In some embodiments, a single code will be allocated per uplink timeslot. In other embodiments, multiple codes are allocated per uplink timeslot. In some embodiments, a single code will be allocated per downlink timeslot. In other embodiments, multiple codes are allocated per downlink timeslot.

In some embodiments, the code or codes used for transmission are varied for each user within a radio frame. Thus, for transmissions spanning multiple code variation periods within the TTI, and for which forward error correction is applied, the benefits of code diversity may be realized and system capacity and performance may be increased.

In some embodiments, a spreading sequence may be changed from timeslot to timeslot by changing the spreading sequence. In some embodiments, the spreading sequence is changed from timeslot to timeslot by changing a scrambling code from timeslot to timeslot. In other embodiments, a spreading sequence may be changed from half-timeslot to half-timeslot. That is, the first half of the payload (210 in FIG. 2) is encoded with a first spreading sequence and the second half of the payload (220 in FIG. 2) is encoded with a second spreading sequence. If the cell is allocated only two scrambling codes and is encoding on a half-timeslot bases, every timeslot will be encoded with the same pair of scrambling codes. If the cell is allocated only four scrambling codes and is encoding on a half-timeslot bases, every other timeslot will be encoded with the same pair of scrambling codes. If the cell is allocated two scrambling codes and is encoding on a timeslot-by-timeslot bases, every other timeslot will be encoded with the same of scrambling code.

Figure 4:
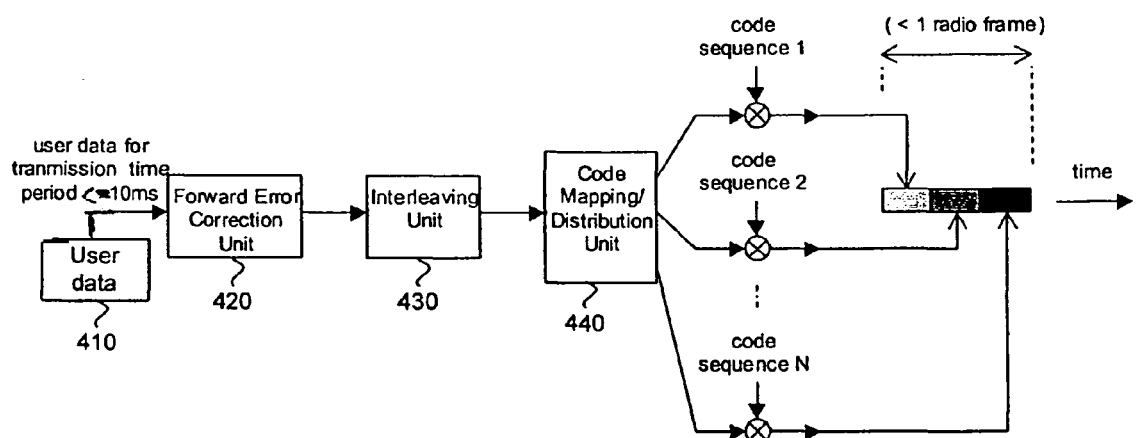
FIG. 4 shows a code diversity transmission scheme for low latency transmission in accordance with the present invention.

FIG. 4 shows a code diversity transmission scheme for low latency transmission. FIG. 4 may apply to either uplink or downlink signals. In 410, user data is provided to the encoding system. Some embodiments include a FEC unit 420, an interleaving unit 430, and a code mapping/distribution unit 440. Other embodiments do not include the FEC 420 and/or the interleaving unit 430. In some embodiments, the user data is applied to an FEC unit 420. The output of the FEC 420 is provided to the interleaving unit 430. The input of the code mapping/distribution unit 440 may be user data from 410 or may be user data applied through either or both 420 and 430.

In some embodiments, the user data is processed with either or both a FEC unit 420 and an interleaving unit 430 as described above. The user data, either preprocessed or not preprocessed is provided to a code mapping/distribution unit 440. The code mapping/distribution unit 440 parses the user data into a sequence of symbols, where a symbol represents one or more bits. If timeslot-by-timeslot cyclic encoding is performed, the code mapping/distribution unit 440 parses the user data into timeslot blocks of data.

FIG. 4 shows a code mapping/distribution unit 440 parsing the user data into three paths. The first path of user data is encoded with code sequence 1. The second path of user data is encoded with code sequence 2. The N-th path of user data is encoded with code sequence N. Code sequence 1 may represent a unique scrambling code. Alternatively, code sequence 1 may represent a unique spreading sequence. In this example, the three codes (code sequences 1, 2 and N) are different. Three timeslots full of uplink traffic in one frame are encoded with three different codes. In a frame repeat pattern of 1, the same three codes may be used for the next three uplink timeslots in the next frame. In a frame repeat pattern of 2, a different three codes may be used for the next three uplink timeslots in the second frame, and then the original three codes may be used again for the next three uplink timeslots in the third frame.

In some embodiments, each uplink timeslot in a frame is allocated a spreading sequence. Some but not all of the spreading sequences used in a frame may be the same. In some embodiments, each uplink timeslot in a frame is allocated a different spreading sequence. In these embodiments, none of the spreading sequences used in a frame are the same.

In addition to cycling the scrambling sequences or spreading codes, a UE may also cycle or similarly vary midamble sequences in uplink and/or bursts.

In some embodiments, the code sequence is varied for each section of payload data. In other embodiments, the code sequence is varied for each payload data.

A 3GPP UTRA TDD receiver is typically a de-correlating receiver. The de-correlating receivers attempt to undo the effects of the radio channel and the code sequences used. The signature sequence is the convolution of the transmission sequence with the radio channel impulse response. This task is computationally intensive and as such, is usually only performed once per timeslot or as required such as when the radio channel or codes used have changed. Thus, the high-complexity part of the receiver may be run at least at the rate of change of the code sequences being transmitted.

The variation in the codes used each timeslot may be the same for each user, or may differ between users. That is to say that the code variation may occur on a cell-by-cell basis, a user-by-user basis or both.

Additionally, either the channelization code or the scrambling code component of the overall spreading sequence may be varied, or both may be varied. A further possibility is that an extra variable code component is applied on top of the existing codes. By varying the sequences within a short TTI (e.g., within 10 ms), code diversity is achieved while maintaining low latency transmission.

Figure 5:
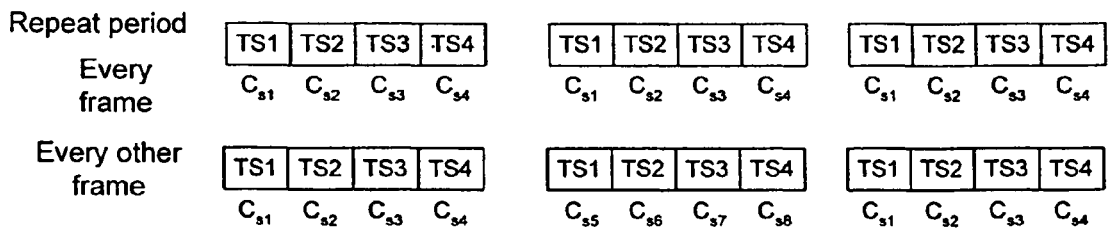
FIG. 5 shows a form of code diversity using timeslot-based cell ID cycling in accordance with the present invention.

FIG. 5 shows a form of code diversity using timeslot-based cell ID cycling. In the first example, a code repeat pattern of every frame used. A frame is shown to have four uplink timeslots (TS1 to TS4). The code sequence $C_{s1}$ is used on user data placed in the first timeslot (TS1). The code sequence $C_{s2}$ is used on user data placed in the second timeslot (TS2). The code sequence $C_{s3}$ is used on user data placed in the third timeslot (TS1). The code sequence $C_{s4}$ is used on user data placed in the fourth timeslot (TS2). Therefore, this first frame of uplink timeslots uses code sequences $C_{s1}, C_{s2}, C_{s3}$ and $C_{s4}$. Since the repeat pattern is every frame, the next frame also uses code sequences $C_{s1}, C_{s2}, C_{s3}$ and $C_{s4}$.

In the second example, a code repeat pattern of every other frame used. A first frame is shown to have four uplink timeslots (TS1 to TS4). The code sequence $C_{s1}$ is used on user data placed in the first timeslot (TS1). The code sequence $C_{s2}$ is used on user data placed in the second timeslot (TS2). The code sequence $C_{s3}$ is used on user data placed in the third timeslot (TS1). The code sequence $C_{s4}$ is used on user data placed in the fourth timeslot (TS2). Therefore, this first frame of uplink timeslots uses code sequences $C_{s1}, C_{s2}, C_{s3}$ and $C_{s4}$. Since the repeat pattern is every other frame, the second frame uses code sequences $C_{s5}, C_{s6}, C_{s7}$ and $C_{s8}$. Code sequences $C_{s1}, C_{s2}, C_{s3}$ and $C_{s4}$ are uses again as shown in the third frame.

In some embodiments of the present invention, a method varies the scrambling code assigned to a cell on a per timeslot basis. In order to enable correct decoding, the variation pattern may be known to both the user and to the base station and may be synchronized between the transmitter and the receiver. In some embodiments of the present invention, the code variation pattern is pre-determined and known a priori by both transmitter and receiver. In some embodiments of the present invention, the code variation pattern is signaled by the network to the user terminal at the start of or sometime during the connection. In some embodiments of the present invention, the code variation pattern is derived by means of an algorithm known to both the transmitter and the receiver and a seed-value or other parameter is signaled at the start of or sometime during the connection. In some embodiments of the present invention, the code variation pattern is a function of a system parameter known to both the transmitter and receiver. For example, the system parameter may be the system frame number. In some embodiments of the present invention, the code variation pattern itself may also be changed at times determined or signaled by the network, or at predetermined times known to both the receiver and transmitter.

In some embodiments of the present invention, the spreading codes used may come from the existing set of defined scrambling and channelization sequences or may be completely new sequences. Alternatively, a new set of sequences could be derived using arithmetic or algorithmic means using the existing sequences as functional inputs.

In some embodiments of the present invention, the midamble sequence used for transmission may also be varied in a similar manner to the codes applied to the payload sections of the burst(s).

Some embodiments of the present invention provide a method of transmission in a TDD CDMA system capable of realizing code diversity benefit for low latency transmissions comprising a transmitter capable of changing the code sequences used for transmission one or more times during transmission of one or more interleaved forward error correction data units. The code sequence may be changed multiple times within a radio frame. Some embodiments of the present invention provide a receiver synchronized to the varying code pattern applied in the transmitter, performing de-interleaving and error correction decoding of the received data unit(s).

Some embodiments of the present invention provide a method in which the transmission code is varied by means of changing the scrambling code one or more times during the transmission of a forward error correction data unit in which the scrambling codes used are: (1) from the existing set of defined scrambling codes for 3GPP TDD CDMA; (2) derived by arithmetical or algorithmic means from the existing set of defined scrambling codes for 3GPP TDD CDMA; and/or (3) any new set of scrambling codes. Some embodiments of the present invention provide a method in which the transmission code is varied by means of changing the channelization code one or more times during the transmission of a forward error correction data unit in which the channelization codes used are: (1) members of the set of defined channelization codes for 3GPP TDD CDMA; and/or (2) any new set of channelization codes. Some embodiments of the present invention provide a method in which the transmission code is varied by means of changing both the scrambling code and the channelization code one or more times during the transmission of a forward error correction data unit. Some embodiments of the present invention provide a method in which the transmission code is varied by means of applying an extra code on top of the existing channelization and scrambling codes during the transmission of a forward error correction data unit.

Some embodiments of the present invention provide a method in which the code variation pattern is implicitly known a priori to both transmitter and receiver. Some embodiments of the present invention provide a method which the code variation pattern is signaled explicitly to the transmitter by network or base station. Some embodiments of the present invention provide a method in which the code variation pattern is derived via algorithmic or arithmetical means based upon parameters: known a priori to both transmitter and receiver; signaled to the transmitter by a network or base station; and/or derived from another system parameters known to both transmitter and receiver or signaled to the transmitter by a network. Some embodiments of the present invention provide a method in which the transmission code is varied on a per-timeslot basis. Some embodiments of the present invention provide a method in which the transmission code is varied on a sub-timeslot basis (e.g.: per data payload, per ½ payload, or per symbol). Some embodiments of the present invention provide a method in which the transmission code is varied on a per-timeslot or sub-timeslot basis by means of changing the scrambling code and/or channelization code, and or an additionally-applied code.

Some embodiments of the present invention provide a method as described by any of the above features as applied to a 3GPP TDD CDMA uplink system, including legacy uplink channels and/or enhanced uplink channels. Some embodiments of the present invention provide a method as described by any of the above features as applied to a 3GPP TDD CDMA downlink system, including legacy downlink channels, HSDPA and future downlink channels. Some embodiments of the present invention provide a method as per any of the above in which the midamble sequence used for burst transmission is also varied as a function of the variation applied to the scrambling/channelization/additional codes.

While the invention has been described in terms of particular embodiments and illustrative figures, those of ordinary skill in the art will recognize that the invention is not limited to the embodiments or figures described. The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of transmitting data on a link from a first radio to a second radio across a plurality of timeslots in a frame, the method comprising:

encoding user data using a forward error correcting code to generate an encoded bit sequence, wherein the user data is data for a single user;

generating a first spread portion of the encoded bit sequence with a first spreading sequence associated with a first portion of the frame, the first spreading sequence based on a first channelization code and a first scrambling code;

generating at least a second spread portion of the encoded bit sequence with a second spreading sequence associated with a second portion of the frame, the second spreading sequence based on a second channelization code and a second scrambling code, wherein the first channelization code differs from the second channelization code according to a predetermined code variation pattern; and transmitting, from the first radio to the second radio, the frame including the first spread portion and the at least second spread portion of the encoded bit sequence.

2. The method of claim 1, wherein a timeslot includes the first portion of the frame and the second portion of the frame.

3. The method of claim 1, wherein the first portion of the frame includes a first timeslot of the frame and the second portion of the frame includes a second timeslot of the frame, wherein the second timeslot is different than the first timeslot.

4. The method of claim 3, wherein the first timeslot and the second timeslot are adjacent timeslots.

5. The method of claim 3, wherein the first timeslot and the second timeslot are timeslots separated by at least one timeslot period.

6. The method of claim 1, further comprising:

generating a third spread portion of the encoded bit sequence with a third spreading sequence associated with a first portion of a second frame, the third spreading sequence based on a third channelization code and a third scrambling code;

generating a fourth spread portion of the encoded bit sequence with the fourth spreading sequence associated with a second portion of the second frame, wherein the fourth spreading sequence is based on a fourth channelization code and a fourth scrambling code, wherein the third channelization code differs from the fourth channelization code; and transmitting, from the first radio to the second radio, the second frame including the third spread portion and the fourth spread portion of the encoded bit sequence.

7. The method of claim 6, wherein the third spreading sequence is the first spreading sequence, and the fourth spreading sequence corresponds to the second spreading sequence according to the predetermined code variation pattern.

8. The method of claim 6, wherein the third spreading sequence and the fourth spreading sequence differ from the first spreading sequence and the second spreading sequence according to the predetermined code variation pattern.

9. The method of claim 1, wherein encoding the user data using the forward error correction code is over a transmission time interval of a single frame.

10. The method of claim 1, wherein encoding the user data using the forward error correction code is over multiple timeslots in a frame.

11. The method of either claim 9 or 10, further comprising applying interleaving over multiple timeslots.

12. The method of claim 1, wherein the first scrambling code is different from the second scrambling code.

13. The method of claim 1, wherein
transmitting, from the first radio to the second radio, the frame including the first spread portion and the second spread portion includes transmitting a first midamble sequence along with the first spread portion and a second midamble sequence along with the second spread portion, wherein the first midamble sequence differs from the second midamble sequence.

14. The method of claim 1, further comprising:
determining the first spreading sequence for the first portion of the encoded bit sequence; and
determining the second spreading sequence for the second portion of the encoded bit sequence.

15. The method of claim 1, wherein the link includes an uplink, wherein the first radio includes a mobile radio, and wherein the second radio includes a base station.

16. The method of claim 1, wherein the link includes a downlink, wherein the first radio includes a base station, and wherein the second radio includes a mobile radio.

17. The method of claim 1, wherein the first scrambling code corresponds to the second scrambling code.

18. A code diversity transmitter comprising:
logic to accept user data;
forward error correction (FEC) logic operable for encoding user data of a single user using a forward error correcting code to generate an encoded bit sequence, the FEC logic coupled between the logic to accept user data and the code mapping and distribution logic, wherein the user data is data for a single user;
code mapping and distribution logic, wherein the code mapping and distribution logic is operable to parse the encoded bit sequence into a first portion and at least a second portion;
spreading logic operable for generating the first spread portion of the encoded bit sequence with a first spreading sequence, the first spreading sequence based on a first channelization code and a first scrambling code, and the spreading logic further operable for spreading the at least second spread portion of the encoded bit sequence with a second spreading sequence, the second spreading sequence based on a second channelization code and a second scrambling code, wherein the first channelization code differs from the second channelization code according to a predetermined code variation pattern; and
a transmitter coupled to the encoding logic and operable for transmitting the first spread portion and the at least second spread portion of the encoded bit sequence.

19. The code diversity transmitter of claim 18, further comprising interleaving logic for applying interleaving, the interleaving logic coupled between the logic to accept user data and the code mapping and distribution logic.

20. The code diversity transmitter of claim 18, wherein the first portion of the encoded bit sequence includes a timeslot block of data.

21. The code diversity transmitter of claim 18, wherein the first scrambling code differs from the second scrambling code.

22. The code diversity transmitter of claim 18, wherein the first scrambling code corresponds to the second scrambling code.

* * * * *